US011933089B2

(12) United States Patent
Aldersley et al.

(10) Patent No.: US 11,933,089 B2
(45) Date of Patent: Mar. 19, 2024

(54) CLOSING BAR OF A MOTOR VEHICLE BODY LOCK, MOTOR VEHICLE BODY LOCK COMPRISING SUCH A CLOSING BAR, AND CORRESPONDINGLY EQUIPPED MOTOR VEHICLE

(71) Applicant: Bayerische Motoren Werke Aktiengesellschaft, Munich (DE)

(72) Inventors: Nicholas Aldersley, Hebertshausen (DE); Michael Brandstaetter, Markt Schwaben (DE); Tomasz Jedraszek, Groebenzell (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 39 days.

(21) Appl. No.: 16/420,450

(22) Filed: May 23, 2019

(65) Prior Publication Data

US 2019/0277070 A1 Sep. 12, 2019

Related U.S. Application Data

(63) Continuation of application No. PCT/EP2017/080753, filed on Nov. 29, 2017.

(30) Foreign Application Priority Data

Dec. 19, 2016 (DE) ..................... 10 2016 225 480.4

(51) Int. Cl.
*E05B 77/38* (2014.01)
*E05B 85/04* (2014.01)

(52) U.S. Cl.
CPC ............. *E05B 85/04* (2013.01); *E05B 77/38* (2013.01); *E05B 85/045* (2013.01)

(58) Field of Classification Search
CPC ......... E05B 85/04; E05B 85/045; E05B 77/38
See application file for complete search history.

(56) References Cited

U.S. PATENT DOCUMENTS 4,470,626 A * 9/1984 Gergoe ................. E05B 85/045
292/DIG. 43
4,911,488 A * 3/1990 Brackmann ............. E05B 81/66
292/201

(Continued)

FOREIGN PATENT DOCUMENTS

CN 102381185 A 3/2012
CN 202359904 U 8/2012

(Continued)

OTHER PUBLICATIONS

International Search Report (PCT/ISA/210) issued in PCT Application No. PCT/EP2017/080753 dated Mar. 1, 2018 with English translation (six (6) pages).

(Continued)

*Primary Examiner* — Michael P Ferguson
*Assistant Examiner* — Thomas L Neubauer
(74) *Attorney, Agent, or Firm* — Crowell & Moring LLP

(57) ABSTRACT

Improved vibration damping in a closing bar of a motor vehicle body lock makes use of a bar which is arranged on a bar plate and which is designed to be movable from a rest position in a working direction and is operatively connected to a counter bearing. A base plate is attached to a motor vehicle body. In the event of a movement of the bar from the rest position, in which the bar has a first rigidity, to a first functional position, which represents the operating state of the closing bar, the counter bearing has a second rigidity, which is lower than the first rigidity, and a third rigidity, which is greater than the second rigidity, in a second (Continued)

functional position, which represents a highly dynamic acceleration of the motor vehicle body lock.

8 Claims, 3 Drawing Sheets

(56) References Cited

U.S. PATENT DOCUMENTS

| | | | | |
|---|---|---|---|---|
| 5,785,366 | A * | 7/1998 | Takaishi ................ | E05B 85/243 292/216 |
| 6,068,309 | A | 5/2000 | Jung et al. | |
| 8,534,745 | B1 * | 9/2013 | Quinn ..................... | E05B 77/38 292/DIG. 3 |
| 2005/0151379 | A1 | 7/2005 | Brose et al. | |
| 2011/0260474 | A1 | 10/2011 | Sambommatsu et al. | |
| 2012/0112474 | A1 | 5/2012 | Muramatsu et al. | |
| 2012/0126550 | A1 | 5/2012 | Patel et al. | |
| 2012/0286525 | A1 | 11/2012 | Kordowski et al. | |
| 2015/0252594 | A1 | 9/2015 | Lee et al. | |
| 2015/0322700 | A1 | 11/2015 | Muramatsu et al. | |
| 2015/0337568 | A1 | 11/2015 | Kim | |

FOREIGN PATENT DOCUMENTS

| | | | |
|---|---|---|---|
| CN | 102725466 | A | 10/2012 |
| CN | 103895713 | A | 7/2014 |
| CN | 104652992 | A | 5/2015 |
| CN | 104703867 | A | 6/2015 |
| CN | 104981577 | A | 10/2015 |
| CN | 204804526 | U | 11/2015 |
| CN | 107110288 | A | 8/2017 |
| DE | 196 30 245 | A1 | 1/1998 |
| DE | 198 35 625 | A1 | 2/2000 |
| DE | 20 2004 002 682 | U1 | 4/2004 |
| DE | 20 2005 015 538 | U1 | 12/2005 |
| DE | 10 2006 002 972 | A1 | 8/2007 |
| DE | 10 2014 117 248 | A1 | 11/2015 |
| EP | 1 186 738 | A2 | 3/2002 |
| EP | 1 550 784 | A1 | 7/2005 |
| JP | 2000-104425 | A | 4/2000 |
| KR | 10-2014-0015663 | | 2/2014 |
| WO | WO 2010/050560 | A1 | 5/2010 |

OTHER PUBLICATIONS

German-language Written Opinion (PCT/ISA/237) issued in PCT Application No. PCT/EP2017/080753 dated Mar. 1, 2018 (six(6) pages).

German-language Search Report issued in counterpart German Application No. 10 2016 225 480.4 dated Oct. 12, 2017 with partial English translation (12) pages).

English translation of Chinese Office Action issued in Chinese Application No. 201780059122.X dated May 27, 2020 (five (5) pages).

* cited by examiner

CLOSING BAR OF A MOTOR VEHICLE BODY LOCK, MOTOR VEHICLE BODY LOCK COMPRISING SUCH A CLOSING BAR, AND CORRESPONDINGLY EQUIPPED MOTOR VEHICLE

CROSS REFERENCE TO RELATED APPLICATIONS

This application is a continuation of PCT International Application No. PCT/EP2017/080753, filed Nov. 29, 2017, which claims priority under 35 U.S.C. § 119 from German Patent Application No. 10 2016 225 480.4, filed Dec. 19, 2016, the entire disclosures of which are herein expressly incorporated by reference.

BACKGROUND AND SUMMARY OF THE INVENTION

The present invention relates to a closing bar of a motor vehicle body lock, a motor vehicle body lock having such a closing bar, and a correspondingly equipped motor vehicle.

A closing bar of a motor vehicle body lock having a bar arranged on a bar plate is known from DE 20 2004 002 682 U1. The bar plate itself is connected to a base plate, which can be fastened to the motor vehicle body by fasteners which can be received in seats which are spaced apart from each other. Abutments serving for vibration and noise dampening are located in these seats, so that the closing bar is designed to be movable in a working direction, starting from a rest position.

The problem which the present invention proposes to solve is to create an alternative means to the prior art.

This problem is solved by a closing bar of a motor vehicle body lock in accordance with embodiments of the invention. It should be noted that the term "bar" includes both bars of closed configuration and bars of open configuration.

The closing bar is provided with a bar arranged on a bar plate and is designed to be movable in a working direction, starting from a rest position. It stands in operative connection with an abutment and has a base plate which can be attached to a motor vehicle body. In the event of a movement of the bar, the abutment has three rigidities depending on its deformation path. By rigidity is meant here the force acting on the bar (dividend) divided by the deformation path (divisor) of the abutment.

In the rest position, the abutment has a first rigidity. The rest position is a functional position in which the bar is basically subjected to no loading (i.e., when a correspondingly equipped motor vehicle body lock is opened) or only a slight loading (i.e., when the motor vehicle body lock, starting from its opened condition, is closed as intended, or starting from its closed condition it is opened as intended). In the rest position, the deformation path of the abutment can increase up to a first threshold value during a closing process of the motor vehicle body lock.

After passing beyond the first threshold value and reaching the operating position of the bar, the abutment is in a first functional position and has a second rigidity, which is less than the first rigidity. The component closed by means of the closing bar, especially a rear gate, is locked in the operating position and a correspondingly equipped motor vehicle will be at standstill or in a driving condition as intended. The relevant deformation path here, in terms of a closing process of the motor vehicle body lock, begins at the first threshold value and ends upon reaching a second threshold value.

If the deformation path is larger than the mentioned second threshold value, the abutment assumes a second functional position, representing a highly dynamic acceleration, which occurs in particular upon highly dynamic closing of the motor vehicle body lock or in an accident-related safety position of same. During a highly dynamic acceleration, the load multiple amounts to as much as 30 g. In the second functional position, the abutment has a third rigidity, which is greater than the second rigidity.

It should be noted that the aforementioned relations exist not only during a closing process, but also—conversely—during an opening process of a corresponding motor vehicle body lock.

As disclosed, the first rigidity and the third rigidity are greater than the second rigidity, so that a correspondingly outfitted motor vehicle body lock is advantageously on the one hand lightweight in its operating condition, and on the other hand functionally secure during a closing or opening as intended and during a highly dynamic closing or opening. Advantageously, the first rigidity and the third rigidity may be equal in magnitude.

Basically, the three rigidities proposed according to the invention may be realized by any desired means in or on the closing bar. According to one preferred embodiment, however, the closing bar according to the invention is characterized at first in that the abutment is arranged close to the bar. In this way, an especially compact yet durable device is advantageously created.

Furthermore, the closing bar according to the invention is characterized in that the bar plate is configured such that, looking in a working direction which acts substantially orthogonally to the bar plate, and starting from the rest position, it assumes the first functional position and the second functional position, wherein the distance between the bar plate and the base plate in the first functional position is larger than their distance in the second functional position. According to one preferred embodiment, the distance between the bar plate and the base plate in the second functional position is greater than their distance in the rest position.

In the rest position, the closing bar in itself is free of a mechanical loading which is typical of locks; in particular, in this condition there is no familiar hook of a motor vehicle body lock engaging with the bar. Thus, the rest position is present in particular when the correspondingly equipped motor vehicle body lock is opened. Furthermore, the rest position occurs when the motor vehicle body lock is being closed, but has not yet passed beyond the first threshold value.

In the first functional position, the closing bar is present in an operating condition in which the hook of the motor vehicle body lock at least partly reaches around the bar in familiar manner and a maximum traction is exerted by the lock against a closing movement in response. The forces accompanying this, as is known, are produced in particular by seals present on the body elements being closed, which are compressed during the closing process. In this functional position, the hook of the motor vehicle body lock is detained on the closing bar and all of its forces opposing the closing movement, especially those produced by the compression of the seals, are overcome. Hence, the closing movement of the motor vehicle body lock is ended and the motor vehicle body lock is firmly closed as intended.

Thus, during a closing movement of a correspondingly equipped motor vehicle body lock, the closing bar starting from its rest position assumes the first functional position and, in the event of a large acceleration, the second functional position. During an opening process free of large acceleration, the closing bar assumes the rest position, starting from the first functional position.

The closing bar according to the invention has the advantage over the closing bar known in the prior art that a secure opening, holding and closing process of a correspondingly equipped motor vehicle body lock is created with simple and reliable means, which is additionally associated with a crash-safe design.

According to one preferred embodiment, the abutment is arranged close to the bar and the bar plate is configured such that, looking in a working direction which acts substantially not orthogonally to the bar plate, and starting from the rest position, it assumes the first functional position and the second functional position. The bar plate can pivot in this process through a first pivot angle about a virtual axis to assume the first functional position and through a second pivot angle to assume the second functional position, which is larger than the first pivot angle. Whereas in the previously disclosed device a damped, translatory movement of the bar plate is made possible, with the device disclosed in this passage a damped rotational movement of the bar plate is advantageously made possible.

According to one preferred embodiment, the abutment and the bar plate are located in a housing arranged on the base plate. The housing creates in particular a mechanical protection against external forces, elements, etc., acting on the device according to the invention, while at the same time acting as a support for the abutment. However, it is understood that the housing need not be entirely closed. Instead, the housing may be partly open, and thus be configured even as a frame in which the abutment, the base plate, and the bar are reliably received.

Advantageously, the closing bar is configured such that the abutment comprises at least a first spring element, which is located between the housing and the bar plate, at least a second spring element, which is located between the housing and the bar plate and situated next to the first spring element, and at least a third spring element, which is located between the bar plate and the base plate. Hence, the first spring element and the second spring elements are parallel to each other and the third spring element is connected in series with them. Said spring elements can basically be made of any suitable material. Especially advantageously, however, the spring elements are made of an elastomer which can be produced easily and economically in large amounts.

This is especially the case when the first spring element is injection molded on the bar plate and the housing.

It is understood that each spring element has a suitable spring constant in order to assume the respective functional positions. Thus, it is possible advantageously for the spring elements to have mutually overlapping biasing. Furthermore, the spring elements according to one preferred embodiment may be influenced not only by the respective spring constants, but also in that the third spring element in the rest position is spaced away from the housing and/or the first spring element.

On the whole, the spring elements are designed so that the overall spring characteristic of the closing bar in the second functional position, corresponding to the operating point of the closing bar, is flatter than in the rest position and the first functional position.

Alternatively or additionally, it is therefore advantageously possible to have the spring constant of the first spring element less than the spring constant of the second spring element.

According to one preferred embodiment, the second spring element in the first functional position and the second functional position is spaced away from the base plate.

The aforementioned problem is also solved by a motor vehicle body lock with a closing bar of the above disclosed kind according to the invention. The aforementioned benefits apply accordingly.

The aforementioned problem is also solved by a motor vehicle with a closing bar or a correspondingly equipped motor vehicle body lock of the above disclosed kind. The aforementioned benefits apply accordingly.

The above described features of the present invention may also be combined with each other, even though not explicitly described above, whenever this is possible.

Other objects, advantages and novel features of the present invention will become apparent from the following detailed description of one or more preferred embodiments when considered in conjunction with the accompanying drawings.

DETAILED DESCRIPTION OF THE DRAWINGS

In the following, making reference to FIGS. 1 to 7, not drawn to scale, a detailed description shall be given for an exemplary embodiment of the present invention. The same elements are given the identical reference numbers, unless otherwise indicated.

Figure 1:
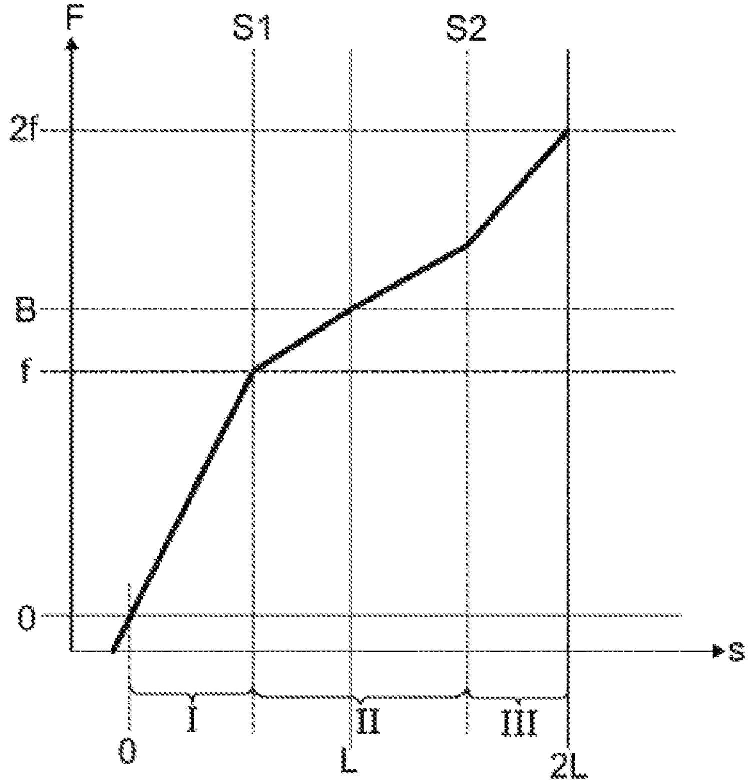
FIG. 1 is an idealized, qualitative force vs. deformation diagram of the abutment of the closing bar according to an embodiment of the invention.

FIG. 1 shows an idealized, qualitative force vs. deformation diagram of an abutment (counterbearing) (cf. reference numbers 55, 60, 65 in FIG. 2 et seq.) of the closing bar (cf. reference number 15 in FIG. 2 et seq.), from which its rigidity, i.e., the quotient of the force F divided by the deformation path s, can be determined.

The abutment 55, 60, 65 has three rigidities, depending on the operating condition of the closing bar 15: in a rest position, denoted by I in FIG. 1, the abutment 55, 60, 65 has a first rigidity. In a first functional position (II in FIG. 1), representing the operating condition of the closing bar 15, the abutment 55, 60, 65 has a second rigidity. In a second functional position (III in FIG. 1), in which a highly dynamic acceleration of the closing bar 15 or that of a correspondingly outfitted part not shown here (such as a rear gate, a front hood, or a vehicle door) occurs, the abutment has a third rigidity. At the transition from the rest position to the first functional position, there is situated a first threshold value S1 on the abscissa of FIG. 1. At the transition from the first functional position to the second functional position, there is situated a second threshold value S2 on the abscissa of FIG. 1.

When the abutment 55, 60, 65 is loaded by a force F, the bar 45 of the closing bar 15 (see FIG. 2 et seq.) travels a deformation path which, in the example shown here, starting from 0 in the rest position and under substantially constant rigidity under a force of substantially f, may amount to substantially 0.75 L, where L is the path which the bar 45 travels, starting from an unloaded position (i.e., force and deformation path are 0) to its normal operating point B. The maximum deformation path in the rest position is reached at the first threshold value S1.

If the first threshold value S1 is exceeded, the device will be in its operating condition, whereby the preferred operating point B in the exemplary embodiment shown here is attained at a force of substantially +1.3 F or a deformation path of substantially +L. The rigidity of the abutment 55, 60, 65 in the first functional position II is less than in the rest position I.

Upon exceeding of the second threshold value S2, which in the exemplary embodiment shown here lies substantially at +1.6 L or +1.5 f, the device will be in the second functional position III. This functional position ends, in the chosen exemplary embodiment, at a deformation path of substantially +2 L or +2 f. According to the invention, the rigidity of the abutment 55, 60, 65 in the second functional position III is greater than that in the first functional position II. Furthermore, the rigidity of the abutment 55, 60, 65 in the second functional position III is greater than in the rest position I. Yet this is not mandatory; instead, the rigidities in the rest position I and the second functional position III may also be the same in magnitude. Alternatively, it is possible for the rigidity in the second functional position III to be less than the rigidity in the rest position I.

As can likewise be seen in FIG. 1, when the loading of the abutment 55, 60, 65 is relieved, there may occur a brief elongation, as is permissible especially with elastic materials. In the exemplary embodiment shown here, the maximum designed elongation is substantially −0.1 L at a force of substantially −0.2 f.

It should be noted that the idealized curve shown in FIG. 1 should be understood qualitatively and may be different in reality. Thus, it is possible for the real curve to be a hysteresis, such as is not unknown in principle for elastic means.

Figure 2:
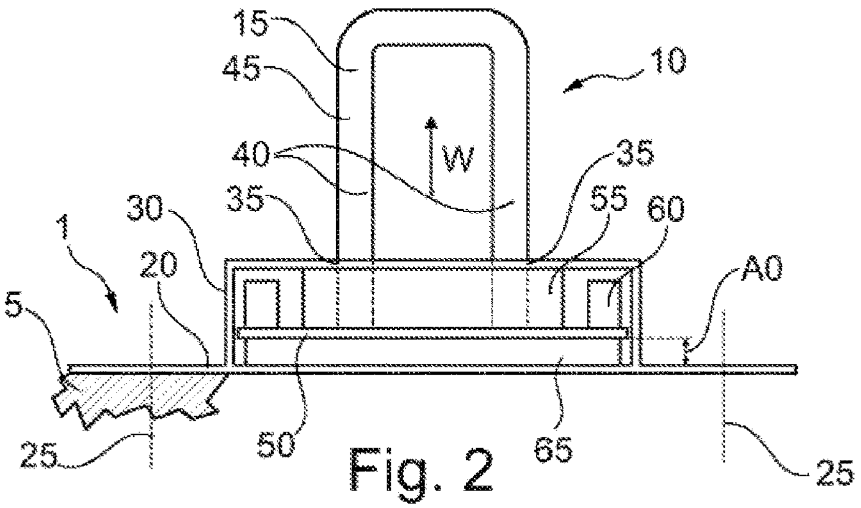
FIG. 2 is a schematic side view of a closing bar according to an embodiment of the invention in the rest position.

FIG. 2 shows an example of a first structural embodiment of the invention. Here, a motor vehicle 1 is shown symbolically, having a motor vehicle body 5. On the vehicle 1 there is provided a likewise symbolically represented motor vehicle body lock 10, with which for example a rear gate, a door, a trunk hood (none of them shown) or the like can be secured on the motor vehicle body 5.

In particular, a closing bar 15 is shown in FIG. 2 in a rest position I. The closing bar 15 comprises a base plate 20, which is secured on the motor vehicle body 5 with symbolically represented fasteners 25. On the base plate 20 there is formed a housing 30, in which two openings 35 are found. Through the openings there protrude two legs 40 of a U-shaped bar 45, being arranged at their respective ends adjacent to the base plate 20 on a bar plate 50. The openings 35 each have an inner diameter which is larger than the respective outer diameter of the bar 45, so that the latter can transmit vibrations without touching the housing 30.

Inside the housing 30 are located a first spring element 55, a second spring element 60 and a third spring element 65, each being made from an elastomer. These three spring elements 55, 60, 65 form an abutment, which interacts with the housing 30, acting as an end stop.

The first spring element 55 is located between the housing 30 and the bar plate 50; moreover, it embraces the portion of the leg 40 immediately adjacent to the bar plate 50. The first spring element 55 is injection molded on both the housing 30 and the bar plate 50.

The second spring element 60 is located between the bar plate 50 and the base plate 20. Unlike the first spring element 55, it is injection molded only on the bar plate 50.

The third spring element 65 is located, spaced away from the first spring element 55, between the housing 30 and the bar plate 50; it is injection molded on the bar plate 50 and lies against the housing 30 at the bottom in FIG. 2.

The distance between the bar plate 50 and the base plate 20 is denoted as A0 in the exemplary embodiment shown here, representing the rest position. In this rest position, the force known from FIG. 1 is for example 0 N and the deformation path is for example 0 mm. The relations denoted by I in FIG. 1 apply here accordingly.

Figure 3:
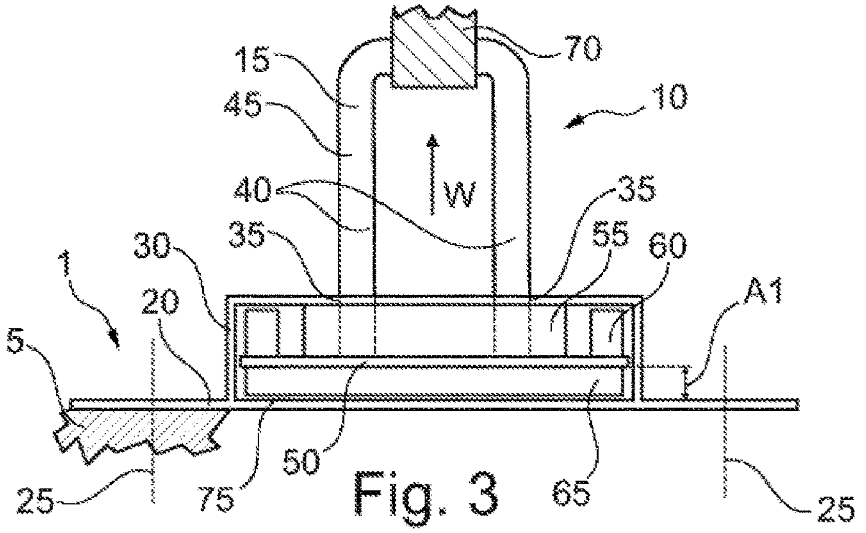
FIG. 3 shows the closing bar of FIG. 2 in a first functional position.

The function of the spring elements 55, 60, 65 shall be explained further with the aid of FIG. 3, representing a first functional position II.

In the first functional position II, representing the operating condition of the closing bar 15, a hook 70 of the motor vehicle body lock 10 reaches at least partly around the bar 45 in a familiar manner and exerts a force F on the closing bar 15. The bar 45 has been moved by the pulling of the hook 70 in the working direction W such that the bar plate 50 together with the first spring element 55 and the third spring element 65 have been moved in the direction of the portion of the housing 30 situated opposite the base plate 20. The third spring element 65 no longer lies against the housing 30. In this first functional position II, the distance between the bar plate 50 and the base plate 20 according to this exemplary embodiment is A1, A1 being larger than A0. The relations denoted by II in FIG. 1 apply here accordingly.

Figure 4:
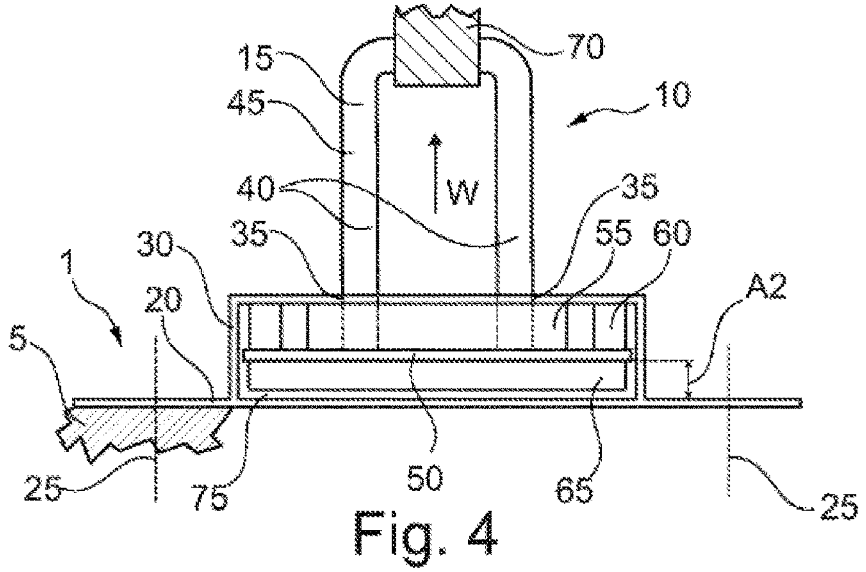
FIG. 4 shows the closing bar of FIGS. 2 and 3 in a second functional position.

The function of the spring elements 55, 60, 65 shall be further explained with the aid of FIG. 4, representing the second functional position III.

In the second functional position III, in which the closing bar 15 is highly dynamically accelerated, for example being closed with high acceleration or being highly accelerated due to an accident, both the first spring element 55 and the second spring element 60 lie against the housing 30. The third spring element 65 is spaced apart from the base plate with a gap A2, which is larger than the gap A1. The relations denoted by III in FIG. 1 apply here accordingly.

Figure 5:
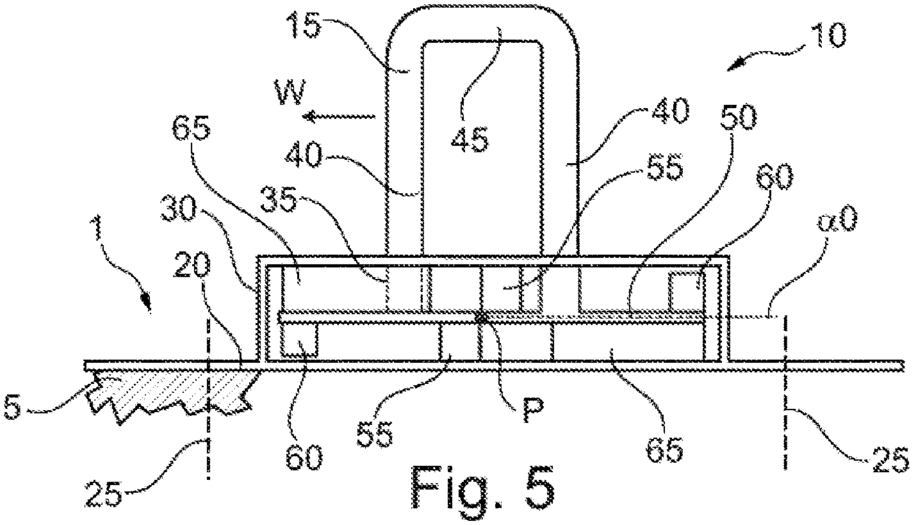
FIG. 5 is a schematic side view of an alternative embodiment of a closing bar according to the invention in the rest position.

FIG. 5 shows an example of a second structural embodiment of the invention, where the working direction W extends, not in the direction of the bar 40, but rather instead transversely to it, specifically to the left on the left leg 40 shown in FIG. 5. The bar plate 50 is oriented substantially parallel to the base plate 20 and has, in the rest position I shown, a pivot angle $\alpha$0, which is defined as 0° with respect to a virtual pivot axis P, being located centrally in the bar plate 50 and orthogonally to the plane defined by the bar 45. However, it should be noted that an asymmetrical arrangement or one in which no spring pairs are required can also be provided.

On the side of the bar plate 50 facing toward the bar 45, looking from right to left in FIG. 5 and spaced apart from each other, are arranged a second spring element 60, a first spring element 55 and a third spring element 65. Correspondingly, on the side of the bar plate 50 facing toward the base plate 20 there are arranged spring elements 55, 60, 65 in point symmetry to the pivot axis P, forming the corresponding center of symmetry.

As can be seen from FIG. 5, the respective spring elements 55, 60, 65 can be secured to the bar plate 50. Furthermore, the respective first spring element 55 and second spring element 65 lie against the housing 30, while the spring element 60 is spaced apart from it in the rest position.

Figure 6:
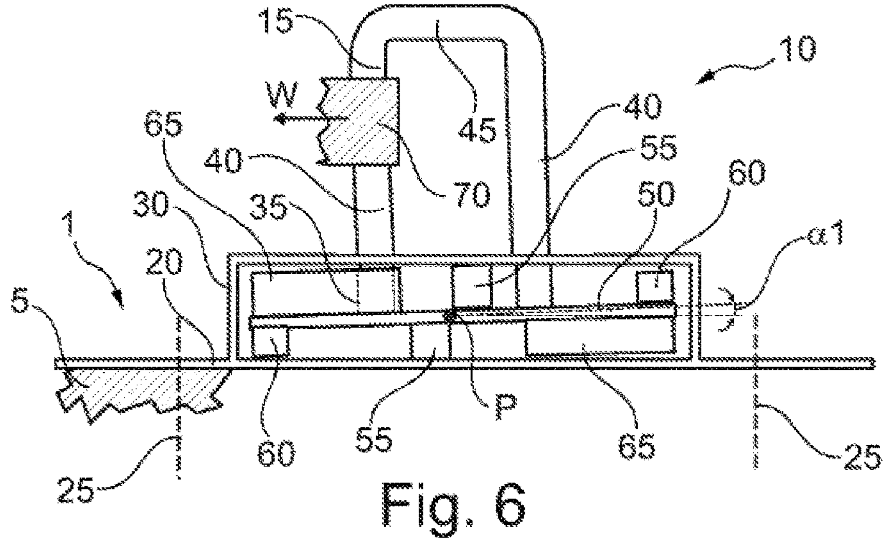
FIG. 6 shows the closing bar of FIG. 5 in a first functional position.

In a first functional position II, representing the operating condition of the closing bar 15 and shown in FIG. 6, a hook 70 of the motor vehicle body lock 10 reaches around the bar 45 in familiar manner, the engagement in this exemplary embodiment occurring at the leg 40 shown at the left side of the figure. The bar plate 50 pivots about the pivot axis P through a first pivot angle α1, which is larger than the pivot angle α0. The first spring element 55 remain in each case bearing against the housing 30, while the second spring element 60 remain at a distance from it and the third spring element 65 are released from it. In this way, a spring rigidity of the overall system is achieved whose curve is represented as II in FIG. 1.

Figure 7:
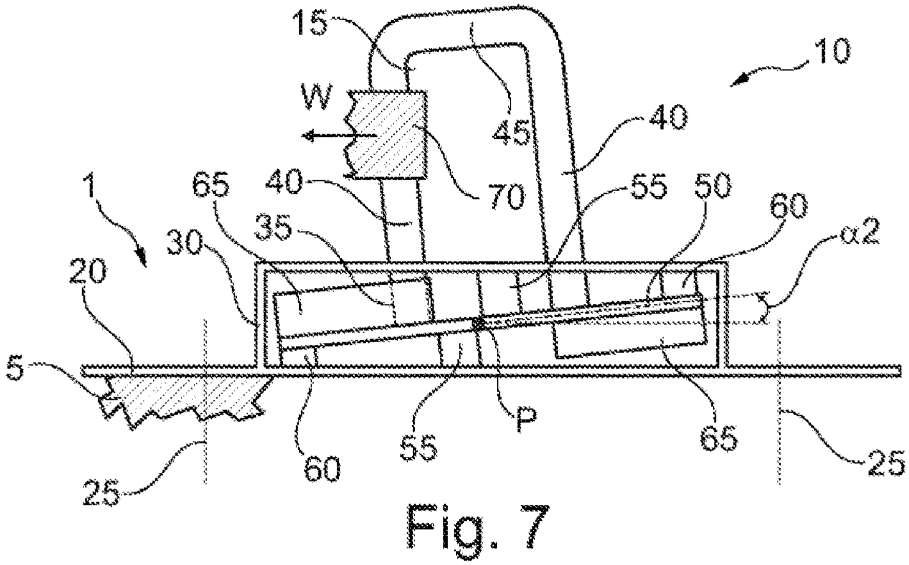
FIG. 7 shows the closing bar of FIGS. 5 and 6 in a second functional position.

FIG. 7 shows the closing bar 15 in a second functional position III, in which it is highly dynamically accelerated in the working direction W. In this case, the bar plate 50 pivots about the pivot axis P through a pivot angle α2, which is larger than the pivot angle α1. The first spring element 55 and the second spring element 60 each lie against the housing 30, while the third spring element 65 is spaced apart from it and makes no contribution to dampening the closing bar 15. The relations denoted by III in FIG. 1 apply here accordingly.

As follows from the previously explained exemplary embodiment, the position of the respective spring elements 55, 60, 65 is influenced from a combination of its intrinsic material properties, such as its spring rigidity, and the particular chosen distances of the mentioned respective spring elements from the housing 30 or that of the second spring element 60 from the base plate 20. However, it is likewise possible that none of the mentioned distances will be formed at any time, if the intrinsic material properties alone are chosen in suitable manner. In such a case, the spring constant of the first spring element 55 is smaller than the spring constant of the second spring element 60. Furthermore, it is possible for the pivot axis P to also be situated in positions other than those shown in FIGS. 4 to 6.

It should be noted that a closing bar 15 can be produced in a simple and advantageous manner by the following method:

1. Providing a bar 45 having legs 40
2. Providing a housing 30 having openings 35
3. Leading the legs 40 through the openings 35
4. Mounting a bar plate 50 on the legs 40 led through the openings 35
5. Injection molding a first spring element 55 on the housing 30 and the bar plate 50
6. Injection molding a second spring element 60 on the bar plate 50
7. Injection molding a third spring element 65 on the bar plate 50
8. Fastening a base plate 20 on the housing 30.

It should be noted that it is also possible to switch around the order of the method steps 5, 6 and 7.

Further, it is possible for the base plate 20 to be already fastened in or after step 2, so that step 8 will coincide with step 2.

LIST OF REFERENCE SYMBOLS

1 motor vehicle
5 motor vehicle body
10 motor vehicle body lock
15 closing bar
20 base plate
25 fasteners
30 housing
35 openings
40 leg
45 bar
50 bar plate
55 first spring element
60 second spring element
65 third spring element
70 hook
75 gap
A0, A1, A2 distances
B operating point
F force
L deformation path
P pivot axis
S1, S2 threshold values
α0, α1, α2 pivot angles
I rest position
II first functional position
III second functional position The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A closing bar of a motor vehicle body lock, comprising:

a bar arranged on a bar plate and configured to be movable relative to the motor vehicle body lock from a rest position in a working direction;

an abutment comprising one or more resilient seat elements, the one or more resilient seat elements being connected to the bar plate;

a base plate being configured to be attached to a motor vehicle body, the base plate housing the abutment and the bar plate;

a housing arranged on the base plate, wherein the abutment and the bar plate are located in the housing;

wherein the abutment is configured to have a first rigidity associated with a first distance or a first pivot angle between the bar plate and the base plate in the rest position;

wherein in a first functional position representing an operating condition, the one or more resilient seat elements are configured to be compressed between the bar plate and the base plate such that the abutment is configured to have a second rigidity associated with a second distance or a second pivot angle between the bar plate and the base plate, the second distance or the second pivot angle being larger than the first distance or the first pivot angle, and the second rigidity being less than the first rigidity; and wherein in a second functional position representing a highly dynamic acceleration the one or more resilient seat elements are configured to be compressed between the bar plate and the base plate such that the abutment is configured to have a third rigidity associated with a third distance or third pivot angle between the bar plate and the base plate, the third distance or third pivot angle being less than the second distance or the second pivot angle, and the third rigidity being greater than the second rigidity.

2. The closing bar as claimed in claim 1, wherein the abutment is arranged close to the bar, and the bar plate is configured such that, viewed in a first working direction which acts substantially orthogonally to the bar plate, and starting from the rest position, the bar plate assumes the first functional position and the second functional position, wherein the first distance between the bar plate and the base plate in the first functional position is larger than the second distance in the second functional position.

3. The closing bar as claimed in claim 1, wherein the abutment is arranged close to the bar, and the bar plate is configured such that, viewed in a second working direction which acts substantially not orthogonally to the bar plate, and starting from the rest position, the bar plate assumes the first functional position and the second functional position, wherein the bar plate is pivotable through a first pivot angle about a virtual axis to assume the first functional position and through a second pivot angle to assume the second functional position, which second pivot angle is larger than the first pivot angle.

4. The closing bar as claimed in claim 1, wherein the abutment comprises at least a first spring element, which is located between the housing and the bar plate, at least a second spring element, which is located between the bar plate and the base plate, and at least a third spring element, which is located between the housing and the bar plate and situated next to the first spring element.

5. The closing bar as claimed in claim 4, wherein the first spring element is connected to the bar plate and the housing via an injection molded connection.

6. The closing bar as claimed in claim 5, wherein the third spring element in the rest position is spaced away from the housing and/or the first spring element.

7. The closing bar as claimed in claim 1, wherein the second spring element in the first functional position and in the second functional position is spaced away from the base plate.

8. A motor vehicle, comprising at least one closing bar as claimed in claim 1.

* * * * *